United States Patent Office 3,044,980
Patented July 17, 1962

3,044,980
SILICONE-POLYESTER COPOLYMER AND PROCESS FOR PREPARING SAME
Frank J. Modic and John E. Saville, Schenectady, N.Y., assignors to General Electric Company, a corporation of New York
No Drawing. Filed Oct. 2, 1959, Ser. No. 843,924
2 Claims. (Cl. 260—45.4)

This invention relates to silicone-polyester copolymer compositions. More particularly, it relates to heat curable silicone-polyester copolymers which are characterized by excellent heat resistance as well as other desirable physical characteristics and which are especially useful in coating applications. This application is a continuation-in-part of our prior application, Serial No. 630,474, filed December 26, 1956, now abandoned, and assigned to the same assignee of this invention.

The use of silicones for heat resisting coating compositions is well known. Generally, in addition to their heat resistant qualities, such compositions have a good gloss, good impact strength and suitable light resistance. However, they leave much to be desired in the way of hardness, adhesion, and mar or abrasion resistance because of their relative softness. Additionally, they have a relatively long cure cycle which is typically over 60 minutes at temperatures of over 450° F. In an attempt to overcome the deficiencies of straight silicone base coating materials, silicones have been combined mechanically or without chemical reaction with polyesters to obtain the heat resistance of the silicone along with the good adhering, hardness, quick cure and mar and abrasion resistance of the polyester. However, it was found that the silicone or organopolysiloxane and polyester were incompatible when used for coating purposes and did not retain the heat resistance of the silicone alone. Even when the silicone and usual polyester are heated together to produce copolymerization, the resulting products are generally deficient in heat resistance, which is required in high temperature insulation as well as protective coating compositions for apparatus subjected to heat, such as heaters, ovens and furnaces, incinerators, ranges, aircraft parts and other industrial equipment.

A principal object of our invention is to provide heat curable silicone-polyester copolymer products which have a relatively short curing cycle and which are characterized by good heat resistance and other desirable physical characteristics.

Briefly, our invention comprises silicone-polyester copolymer compositions in which (1) suitably hydrolyzed silanes are copolymerized with (2) a hydroxyl rich polyester produced by the reaction of by weight (a) from 25–60 equivalent percent of a lower dialkyl ester of a member selected from the group consisting of isophthalic acid, terephthalic acid and mixtures of such members, (b) from 10–50 equivalent percent of ethylene glycol, and (c) from 20–60 equivalent percent of a saturated aliphatic polyhydric alcohol having at least three hydroxyl groups.

The features of our invention which are believed to be novel are set forth with particularity in the claims appended hereto. The invention, itself, however, both as to its organization and method of operation, together with further objects and advantages thereof, can best be understood by reference to the following description.

The alkyl silanes useful in conjunction with this invention are those in which the alkyl groups attached to the silicon atom are methyl or ethyl or mixtures thereof and in which the hydrolyzable component is preferably a halogen, the hydrolyzable groups numbering from one to three. The aryl silanes preferred are those in which the aryl group is phenyl or halophenyl with, again, the hydrolyzable groups being preferably halogen and numbering from one to three. Alkyl aryl silanes are also useful. It is well known that the lower alkyl groups and the phenyl group impart greater heat stability to silicone materials; hence, the preference for these materials. However, up to twenty-five percent of material containing other than methyl, ethyl and phenyl groups or derivatives thereof can be tolerated without serious loss of heat resistance, including alkyl groups containing from two to five or more carbon atoms. While for best results and low cost the hydrolyzable group should be a halogen, other hydrolyzable groups such as alkoxy, amino, aryloxy, and acyloxy can be used. While the preferred silicon-bonded (i.e. attached to Si by C—Si linkages) methyl and phenyl groups can be present in any proportion, we prefer to have from about 40 to 60 percent methyl groups with the rest phenyl. The exact proportion to be used will depend upon the particular properties desired in the final product. While both methyl and phenyl groups are superior in heat resistance, an excessive amount of methyl groups tends toward a brittle product while an excess of phenyl groups causes too much thermoplasticity. The above prescribed proportions result in an end product which has the most desirable combination of physical properties. We prefer that the ratio of organic groups to silicon atoms range from 1.0 to 1.75 and most preferably from 1.0 to 1.55.

The organosilanes can be hydrolyzed in any of the usual manners, as for example by means of suitably catalyzed solution or in water alone. While such usual methods of hydrolysis in which the organosilanes are often dissolved in a solvent such as an alcohol such as methyl, ethyl, propyl or butyl alcohol, a hydrocarbon solvent such as benzene, toluene, xylene, etc., in ethers such as diethyl, dibutyl ether, etc. or in various ketones such as acetone, methyl ethyl ketone, diethyl ketone and the like are useful where the hydrolyzed product is to be used as such, when it is to be later copolymerized with a polyester, the incompatibility of the polyester with such solvents complicates the copolymerization of the silicone material and the polyester. We therefore prefer to carry out the hydrolysis of our organosilanes in the presence of an organic solvent which is immiscible with water and which acts as a solvent for the polyester which is later to be reacted wtih the hydrolyzed material. Such solvents are the aliphatic esters of which butyl acetates, propyl acetates, amyl acetates, hexyl acetates, and the various propionates and butyrates are exemplary. In order to prevent ester interchange, an alcohol having the same organic radical as the alcohol residue of the ester is mixed in smaller amount with the ester. In this process, which is described more fully in U.S. Patent 2,687,399 issued August 24, 1954, the proportions of organosilane, ester, alcohol and water can be varied widely. In general, it is only required that water be available in such amount that the hydrolysis be carried out and to dissolve any hydrogen halide. The quantity of ester used ranges from about 10% to 60%, by weight of the silanes used, while the alcohol if present in an amount equal to about 10 percent by weight of the ester serves the purpose of preventing cross-esterification. The hydrolysis process is carried out to the point where a maximum number of OH groups is formed without causing condensation or gelling or to the point where a homogeneous, clear, compatible copolymer is obtained when the hydrolyzed silanes are reacted with the polyester. Preferably, the reaction is carried out at a temperature under 40° C., although temperatures up to about 70° C. are permissible. At temperatures of over 70° C. an inferior product results.

The following examples are illustrative of the hydrolysis of organosilanes in connection with this invention.

EXAMPLE 1

There were placed in an ice-cooled vessel equipped with an agitator, a thermometer and a dropping funnel, 650 grams of n-butyl acetate, 72 grams of butanol and 1010 g. of water. In the dropping funnel there was placed a blend of 149 g. methyltrichlorosilane, 91 g. dimethyldichlorosilane, 81 g. diphenyldichlorosilane and 179 g. phenyltrichlorosilane. The organosilane blend was added slowly to the mixture in the vessel with agitation, the temperature being kept below 40° C. After the silane addition, the mixture was stirred for 10 minutes. The acid solution formed during the hydrolysis was allowed to settle and was drawn off. The siloxanol solution was then agitated with 300 g. of water and the water layer again drawn off. The remaining solution having a solids content of about 30 percent was then filtered. The solution had a viscosity less than 20 cp. measured with a Brookfield viscosimeter at 25° C.

EXAMPLE 2

Example 1 was repeated except that the vessel was charged with a mixture of 795 g. n-butyl acetate, 88 g. butanol and 1010 g. water. The organosilane mixture consisted of 147 g. methyltrichlorosilane, 91 g. dimethyldichlorosilane, 81 g. phenyltrichlorosilane and 179 g. diphenyldichlorosilane.

EXAMPLE 3

Example 1 was repeated except that the hydrolyzing solution consisted of 854 g. n-butyl acetate, 79 g. butanol, and 903 g. water. The organosilane mixture consisted of 187 g. dimethyldichlorosilane, 276 g. phenyltrichlorosilane and 37 g. diphenyldichlorosilane.

EXAMPLE 4

Example 1 was repeated except that the vessel was initially charged with 650 g. n-butyl acetate, 72 g. butanol, and 1010 g. water to which there was added 500 g. of phenyltrichlorosilane.

EXAMPLE 5

Example 1 was repeated except that the organosilane blend consisted of 212 g. phenyltrichlorosilane, 65 g. dimethyldichlorosilane, 127 g. diphenyldichlorosilane and 150 g. methyltrichlorosilane.

EXAMPLE 6

Example 1 was repeated except that the silane mixture consisted of 212 g. phenyltrichlorosilane, 191 g. phenylmethyldichlorosilane and 150 g. methyltrichlorosilane.

EXAMPLE 7

Example 1 was repeated except that the silane blend was made up of 276 g. phenyltrichlorosilane, 37 g. phenylmethyldichlorosilane and 187 g. dimethyldichlorosilane.

As pointed out above, the hydroxyl rich polyesters used in our invention are those which are formed by the reaction of (a) a lower dialkyl ester of a member selected from the group consisting of isophthalic acid, terephthalic acid and mixtures thereof, (b) ethylene glycol, and (c) a saturated aliphatic polyhydric alcohol having at least three hydroxyl groups. Such polyesters are generally disclosed in copending Precopio and Fox application Serial No. 474,624, filed December 10, 1954, now Patent 2,936,296, and assigned to the same assignee as this application. In making our polyester, the lower dialkyl ester is used in amounts ranging from 25–60 equivalent percent and preferably from 25–53 equivalent percent, the ethylene glycol in amounts of from 10–50 equivalent percent and preferably from 15–42 equivalent percent and the saturated aliphatic polyhydric alcohol from 20–60 equivalent percent and preferably from 28–50 equivalent percent. The preferred specific composition comprises the reaction product of 32 equivalent percent lower dialkyl ester, 20 equivalent percent ethylene glycol and the saturated aliphatic polyhydric alcohol 48 equivalent percent.

Among the lower dialkyl esters of isophthalic and terephthalic acid which are useful are those in which the alkyl radicals have from 1 to 8 and preferably 1 to 4 carbon atoms, including for example the dimethyl ester, the diethyl ester, the dipropyl ester, the dibutyl ester, etc.

The terms "polyhydric alcohol" and "saturated aliphatic polyhydric alcohol having at least three hydroxyl groups" include both polyhydric alcohols in which the hydroxyl groups are connected by a plurality of carbon to carbon linkages as well as ether alcohols having more than three hydroxyl groups. Among the saturated aliphatic polyhydric alcohols having at least three hydroxyl groups useful in this invention are included, for example glycerin, 1,1,1-trimethylol ethane, 1,1,1-trimethylol propane, pentaerythritol, sorbitol, mannitol, diglycerol, dipentaerythritol and the like.

The term "equivalent percent" as used in this application refers to the total number of equivalents of the particular reactant material concerned divided by the total number of equivalents of all reactants used in making the polyester, the reactants reacting equivalent for equivalent rather than mole for mole. For example, the equivalents of dimethyl terephthalate in a given quantity is the number of moles times two. The number of equivalents of glycerin is the number of moles times three etc.

The synthetic polyester resins employed in the present invention may be formed in conventional ways. Thus, the lower dialkyl ester of terephthalic acid or isophthalic acid, the ethylene glycol and the higher polyhydric alcohol are merely added to any suitable reaction vessel. This reaction vessel may be formed of any suitable material such as glass, stainless steel or any of the other metals commonly employed in processing polyester resins. Since the reaction involved in forming the polyester resins of the present invention is essentially an alcoholysis reaction, the net effect of the reaction is to substitute a polyhydric alcohol or a glycol for the lower alkyl radicals of the lower dialkyl isophthalates or terephthalates with the concurrent liberation of the lower alcohol. In the case of the dimethyl esters of the acids the alcohol which is liberated is methanol. Therefore, suitable means should be provided for eliminating the methanol or other lower alcohol liberated during the reaction period. In general, heat is applied to the reaction mixture and the lower alcohol liberated is either vented to the atmosphere or collected in a condenser system. Since the lower dialkyl esters of terephthalic acid have a tendency to sublime when heated too rapidly, it is desirable to provide means for condensing this sublimate while still allowing the lower alcohols to escape from the system. This may be accomplished by operating a condenser over the reaction vessel at a temperature suitable to condense the sublimate while allowing the lower alcohol vapors to escape.

Since alcoholysis reactions are rather slow when carried out without catalysts, we prefer to use alcoholysis catalysts when preparing the polyester resins used in the present invention. Among the many alcoholysis catalysts which may be used are included for example, lead oxides, lead acetate, zinc oxide, cadmium acetate, cuprous acetate, zinc acetate, magnesium acetate, beryllium acetate, stannic acetate, ferric acetate, nickel acetate, etc. The amount of catalyst employed is not critical and may vary over a wide range depending on the particular polyester system under consideration. In general, we employ from about 0.01 to about 5 percent, by weight, of the alcoholysis catalyst, based on the total weight of the dibasic acid compounds. Higher concentrations of such catalyst may be employed but no advantage is gained by such use. Preferably, we employ about 0.1 percent, by weight, of the metallic component of catalyst based on the total weight of the dibasic acid employed.

In preparing the polyester resins employed in the present invention we have found it desirable to heat the reactants in such a manner that we can control the molecular weight of the polyester. This is desirable in that the polyester must be able to form a homogeneous solution with the siloxanol solution in order to form the desired copolymer resin. The reaction is accomplished by heating the reactants and alcoholysis catalysts from room temperature to a temperature of approximately 100° C. at which time the reactants are dissolved. The dissolved reactants are then heated with agitation and sparged with nitrogen gas to 160° C. with a maximum temperature of 200° C. allowable. The reaction is stopped when the desired room temperature viscosity of 38,000 to 42,000 centipoises at 25° C. is achieved. An indication of this point is the amount of alcohol carried out of the system. For the desired viscosity of 38,000 to 42,000 centipoises, the alcohol so passed from the system should range from about 67.5% to 68.5% by weight of the alcohol theoretically available.

The following examples will illustrate the preparation of the polyester.

EXAMPLE 8

A polyester resin was prepared from the following ingredients:

Dimethylisophthalate [1] ____ 338 g. (29.5 equiv. percent)
Glycerin (99%) _____ 163 g. (44.3 equiv. percent)
Ethylene glycol _____ 97 g. (26.2 equiv. percent)

[1] Dimethylisophthalate assayed as 78% by weight dimethylisophthalate and 22% dimethylterephthalate.

The above ingredients were added along with 0.145 g. lead acetate to a three-necked flask equipped with a thermometer, stirrer and Vigireux column condenser and receiver and heated to 100° C.–120° C. to melt the dimethylisophthalate, the reactants forming a two-phase system at this point. A nitrogen sparge was used. With continued heating at about 160° C. an ester interchange reaction began, the methyl groups of the dimethylisophthalate being displaced by the polyhydric alcohol forming methanol and a complex polyester. The methanol was carried through the column and out of the system by the nitrogen sparge. After about two-thirds (about 74 g.) of the theoretical available methyl alcohol had been collected, the reaction was stopped by cooling with a water bath. The final polyester had a viscosity of about 40,000 centipoises (cp.) as measured with a Brookfield viscosimeter at 25° C. and about 100 percent polyester on a solids basis.

Example 8 was repeated to produce polyesters of about 40,000 cp. viscosity using the ingredients shown in Table I as follows.

temperature is raised to 175° C. to 180° C. The reactants are copolymerized in this temperature range until a sample of the copolymer placed on a cure plate at 200° C. had a gel time of 30 seconds. Methanol and water are expelled from the system. The reaction mixture is then cooled quickly by adding a suitable solvent to a solids content of about 65 percent, by weight, and a viscosity of about 200 to 350 cp. at 25° C. Finally, the resin is filtered. For final copolymer products having desired physical characteristics, the polyester should preferably have a viscosity of between about 38,000 to 42,000 cp. measured as above. Polyesters of less than 38,000 cp. produce copolymers which tend to be soft, slow curing and of poor mar resistance. However, polyesters of less than 38,000 centistokes viscosity are useful when certain of the above properties can be used as increased softness, longer cure or less mar resistance can be tolerated. Polyesters of over 42,000 cp. viscosity do not copolymerize readily or co-condense with the silicone intermediate and tend to produce two-phased final products. There is described in copending applications to Saville, Serial No. 630,475, filed December 26, 1956, now abandoned, and Serial No. 821,121, filed June 18, 1959, filed concurrently herewith, procedures of making compatible silicone-polyester copolymers in which polyesters having viscosities of over 42,000 cp. are used.

Among the solvents which can be used to dissolve and cool the copolymer after reaction are the relatively polar solvents including hydrocarbons such as benzene, toluene, xylene, hexanes, ketones and the like, alcohols such as methanol, ethanol, propanol, butanol, etc. and ketones such as acetone, methylethyl ketone, diethyl ketone, etc. Cellosolve, methyl Cellosolve acetate, ethyl acetate, propyl acetates, and ethers such as diethyl, ethylpropyl, dipropyl, propylbutyl and cyclic ethers among others. Other suitable polar solvents will occur to those skilled in the art.

The proportions of silicone and polyester constituents in the copolymerization mixture depend upon the particular properties desired in the final product. Generally, for maximum service at temperatures of 400° F. and above we prefer to use by weight from 70 percent to 95 percent silicone with the remainder polyester. At lower silicone contents, the heat resistance lessens. For example, at a silicone content of 25 percent, the resulting material provides suitable heat resistance at temperatures of the order of about 275° F.–350° F.

The following examples are illustrative of the copolymerization of the silicone and polyester components.

*Table I*

|  | 8 | 9 | 10 | 11 | 12 | 13 | 14 | 15 | 16 | 17 | 18 | 19 |
|---|---|---|---|---|---|---|---|---|---|---|---|---|
| Dimethyl Isophthalate | 338 | 338 | 338 |  | 338 | 336 | 194 | 194 | 194 | 194 | 200 | 194 |
| Dimethyl Terephthalate |  |  |  | 338 |  |  |  |  |  |  |  |  |
| Trimethylol Propane |  | 233 |  |  | 233 |  |  |  |  |  |  |  |
| Trimethylol Ethane |  |  | 209 | 209 |  |  |  |  |  |  |  |  |
| Glycerine | 163 |  |  |  |  | 163 | 134 |  |  |  |  |  |
| Ethylene Glycol | 97 | 97 | 97 | 97 |  | 67 | 26.7 | 169 | 70.5 | 65.8 | 94 | 73.5 |
| Neopentyl Glycol |  |  |  |  | 161 |  |  | 74.5 | 46.5 | 18.6 | 94.3 | 28 |
| Lead Acetate | 0.083 | 0.083 | 0.083 | 0.083 | 0.083 | 0.145 | 0.085 | 0.085 | 0.085 | 0.085 | 0.085 | 0.085 |

The copolymerization of the hydrolyzed silane and polyester intermediates is carried out by charging the intermediates in desired proportions to a suitable vessel having an agitator, thermometer, condenser, receiver, cold trap and an adjustable vacuum source. With the ingredients in the vessel, the system pressure is reduced to a pressure of from 600 to 400 mm. of mercury absolute and preferably 500 mm. of mercury. With stirring, heat is applied to flash off the solvents such as butanol and butyl acetate at a reasonably low temperature leaving the polyester and silicone constituents at a relatively high solids content. When a temperature of 135° C. is reached after about 30 minutes, the system pressure is lowered over a period of about 30 minutes to 100 mm. of mercury absolute and at the same time the

EXAMPLE 20

The silicone material of Example 1 in the amount of 75 percent (1,000 g.) by weight was added to 25 percent by weight (106 g.) of the polyester of Example 8 based on the silicone and polyester contents (it being remembered that the silicone intermediate contains 30 percent silicone and the polyester intermediate essentially 100 percent polyester) were charged to a vessel fitted with a thermometer, agitator and a condenser, receiver, cold trap, monometer and vacuum source. With the system reduced to 500 mm. Hg absolute and with stirring, the temperature was raised to about 135° C. to flash off the butyl acetate-butanol silicone solvent. When after about 30 minutes the temperature reached about 135°

C., the pressure was lowered to about 100 mm. Hg absolute and the temperature raised to 175° C. to 180° C. over a period of about 30 minutes. The copolymerization was carried out at this latter temperature until a sample withdrawn from the vessel had a gel time of 30 seconds on a 200° C. cure plate. The reacted material was then cooled rapidly by adding 215 g. of a mixture of by weight 70 percent xylene and 30 percent n-butanol. The resin was then filtered with a filter aid and fuller's earth. An enamel was made from the above final material by mixing a millbase formed from 60 g. of the copolymer using 130 g. of titanium dioxide and ball milling and then cutting the millbase with enough additional resin to give a pigment to resin ratio of 0.7. The viscosity was adjusted with xylene to a viscosity of from 20–25 sec., #4 Ford cup. The enamel was sprayed on 4 x 6 inch, 37.5 mil thick cold rolled steel panels by spraying to an enamel thickness of 3 mils. The sprayed panels were air dried for 15 minutes, precured 15 minutes at 125° C. and cured for 30 minutes at 250° C. After the above cure, the enamel had a gloss of 85 as measured with a 60° Gardner gloss meter, an impact as measured in the Gardner variable impact tester of greater than 30 lb.-in. and a pencil hardness as measured with Venus drawing pencils of 2H and good adhesion. The sprayed panels were heat-aged for 642 hours at 225° C. at which time the physical characteristics as measured above were 65 gloss, 2 lb.-in. impact and hardness 4H and the adhesion good. Adhesion was judged as good if during the pencil hardness test the pencil point cut a smooth slot the width of the point. If the film broke away in small discs during the pencil hardness test, the adhesion was considered poor. An intermediate condition was considered fair adhesion.

Example 20 was repeated using 75 percent silicone and 25 percent polyester as shown in Examples 21 through 25 and 34 of Table II below with the resultant physical characteristics shown for enamels cured and heat aged as indicated. Examples 26 through 33 of Table II are similar to the others except that the copolymerization took place under atmospheric conditions, flashing the solvents off quickly. This process is described in the above referred to copending applications to Saville assigned to the same assignee as this application.

Table II

| Example | Silicone (Ex.) | Polyester (Ex.) | Cure 30 Minutes at 250° C. | | | | Heat Age 642 Hrs. at 225° C. | | | | Cure 30 Minutes and Heat Age 2 Hours at 225° C. | | | |
|---|---|---|---|---|---|---|---|---|---|---|---|---|---|---|
| | | | Gloss | Impact | Hardness | Adhesion | Gloss | Impact | Hardness | Adhesion | Gloss | Impact | Hardness | Adhesion |
| 21 | 1 | 9 | 80 | 30 | 4H | (¹) | 72 | 2 | 5H | (¹) | | | | |
| 22 | 1 | 10 | 82 | 30 | 4H | (¹) | 68 | 1 | 5H | (¹) | | | | |
| 23 | 1 | 11 | 79 | 25 | 2H | (¹) | 76 | 1 | 5H | (¹) | | | | |
| 24 | 1 | 12 | 85 | 30 | 2H | (¹) | 66 | 0 | 5H | (¹) | | | | |
| | | | | | | | (Crazed at 300 hours) | | | | | | | |
| 25 | 1 | 13 | 83 | 30 | 2H | (¹) | 68 | 2 | 4H | (¹) | | | | |
| 26 | 1 | 14 | | | | | | | | | 91 | 9 | 3H | Good. |
| 27 | 1 | 15 | | | | | | | | | 90 | 5 | 3H | Do. |
| 28 | 1 | 16 | | | | | | | | | 82 | 30 | 3H | Do. |
| 29 | 1 | 17 | | | | | | | | | 86 | 30 | 3H | Do. |
| 30 | 1 | 18 | | | | | | | | | 86 | 22 | 3H | Do. |
| 31 | 1 | 19 | | | | | | | | | 88 | 30 | 3H | Very good. |
| 32 | 6 | 13 | | | | | | | | | 95 | 4 | 5H | Do. |
| 33 | 5 | 13 | | | | | | | | | 95 | 2 | 5H | Do. |
| 34 | 7 | 13 | | | | | | | | | 88 | 25 | 2H | Do. |

¹ Good

EXAMPLE 35

Example 20 was repeated using the silicone of Example 1 in the proportion of 25 percent by weight and 75 percent by weight of a polyester comprising the reaction product of 388 g. dimethylisophthalate, 53 g. ethylene glycol, 268 g. glycerin and 0.17 lead acetate as a catalyst reacted according to Example 8. When cured for 30 minutes at 250° C. the enamel had good gloss, a pencil hardness of 4H and good impact strength. While compositions containing less than about 50 percent by weight of silicone as in Example 35 are not as heat resistant, they are of use in insulating varnishes and for finishes generally where good durability at moderate temperatures is sought.

EXAMPLE 36

Example 20 was repeated using the silicone of Example 1 along with a polyester made up of the reaction product of 148 g. phthalic anhydride, 186 g. trimethylol propane and 74 g. ethylene glycol along with 1.05 g. lead acetate catalyst. When an enamel was made from the copolymer as in Example 20 and applied and cured on a panel as described in the same example and subsequently aged at 225° C., the enamel failed by crazing after about 300 hours.

Example 20 was repeated using the silicone of Example 1 and the polyester of Example 8, the polyester having a viscosity of about 42,000 centipoises at 25° C.

The silicone material and polyester material were combined as described in Example 20 and enamels were compounded therefrom and tested as described therein except that the panels were doctor bladed with the enamel instead of sprayed, air dried for 15 minutes, precured for 15 minutes at 150° C. and then cured for one hour at 225° C. The proportions of silicone material and polyester used and the results obtained with various cures and heat aging are set forth in Table III below:

Table III

| Ex. | Percent Silicone | Cure 1 hr. at 225° C. | | | | Heat age 64 hrs. at 250° C. | | | |
|---|---|---|---|---|---|---|---|---|---|
| | | 60% Gloss | Impact (#-in.) | Hardness | Mar Resistance | 60% Gloss | Impact (#-in.) | Hardness | Mar Resistance |
| 37 | 95 | 84 | 9 | B | good | 39 | 0 | 2H | poor. |
| 38 | 85 | 78 | 29 | F | do | 41 | 0 | 5H | good. |
| 39 | 60 | 41 | 9 | 3H | do | 10 | 0 | 5H | poor. |
| 40 | 70 | 79 | 17 | H | do | 19 | 0 | 5H | good. |
| 41 | 75 | 85 | 21 | H | do | 39 | 1 | 5H | Do. |

From the above table it would be apparent that useful materials may be prepared from silicone-polyester combinations as described containing from about 70 to 95% by weight of silicone.

In general, copolymers using dimethylisophthalate and dimethylterephthalate produce very flexible resins with good craze life. Of the various enamels tested, glycerin is the best trihydric alcohol from the point of view of craze life and color retention. Ethylene glycol and neopentyl glycol are about equal in performance.

Not only are the resins of the present invention characterized by a long heat aging life at high temperatures, but they are extremely resistant to thermal shock. Panels having enamels made as above using our materials have been cyclically heated at 225° C. for 24 hours and then plunger into water at about 10° C. for as many as 10 cycles without crazing or otherwise failing.

The products of the invention instead of being compounded into enamels or paints can be used for dip coating or otherwise coating structures by preparing solutions of the product with organic solvents such as toluene, xylol, butanol, Cellosolve and other polar solvents. The cured coatings are characterized by good electrical insulating qualities and excellent heat resistance. The products can also be used for preparing laminates.

It will be seen that by our invention we have provided coating compositions comprising the reaction product of hydrolyzed silanes with particular polyesters which are characterized by salutary heat resistance particularly with higher silicone content, mar resistance, high gloss, color retention, impact strength and good electrical properties. Their cure time of about 30 minutes at temperatures of about 250° C. is desirably short when compared to ordinary silicone coating compositions which generally require a cure of over 60 minutes at temperatures over 250° C.

What we claim as new and desire to secure by Letters Patent of the United States is:

1. The process of making a homogeneous silicone-polyester copolymer composition which comprises (A) stripping a reaction mixture of (1) an aliphatic ester and alcohol-containing solution of 70 to 95% by weight, based on the weight of said copolymer, of the hydrolysis product of a mixture of organochlorosilanes having an average of from about 1.0 to 1.75 organic groups per silicon atom and (2) from 30 to 5% by weight, based on the weight of said copolymer, of a polyester material having a viscosity of between about 38,000 centipoises to 42,000 centipoises at 25° C. and (B) thereafter heating the resulting stripped product at a pressure below about 100 millimeters at a temperature from about 175° C. to about 200° C., the organo groups of said organochlorosilanes being attached to silicon through carbon-silicon linkages and being selected from the class consisting of lower alkyl groups, aryl groups, halogenated aryl groups and mixtures thereof, said polyester material comprising the reaction product of (a) from 25 to 60 equivalent percent of a lower dialkyl ester of a member selected from the class consisting of isophthalic acid, terephthalic acid and mixtures thereof, (b) from 10 to 50 equivalent percent of ethylene glycol, and (c) from 20 to 60 equivalent percent of a saturated aliphatic polyhydric alcohol having at least 3 hydroxyl groups.

2. The product produced by the process of claim 1.

References Cited in the file of this patent
UNITED STATES PATENTS

| | | |
|---|---|---|
| 2,607,755 | Bunnell | Aug. 19, 1952 |
| 2,721,854 | Kohl | Oct. 25, 1955 |
| 2,821,518 | Edelman et al. | Jan. 28, 1958 |
| 2,877,202 | Olson | Mar. 10, 1959 |